(12) United States Patent
Russell et al.

(10) Patent No.: US 8,429,623 B2
(45) Date of Patent: Apr. 23, 2013

(54) PROCESSING ENGINE FOR ENABLING A SET OF CODE INTENDED FOR A FIRST PLATFORM TO BE EXECUTED ON A SECOND PLATFORM

(75) Inventors: Kenneth B. Russell, Sunnyvale, CA (US); Ira A. Wyant, Sunnyvale, CA (US)

(73) Assignee: Oracle America Inc., Redwood Shores, CA (US)

( * ) Notice: Subject to any disclaimer, the term of this patent is extended or adjusted under 35 U.S.C. 154(b) by 1307 days.

(21) Appl. No.: 11/654,236

(22) Filed: Jan. 16, 2007

(65) Prior Publication Data
US 2008/0172656 A1 Jul. 17, 2008

(51) Int. Cl.
G06F 9/45 (2006.01)
G06F 9/44 (2006.01)
(52) U.S. Cl.
USPC ............ 717/136; 717/127; 717/159; 717/151
(58) Field of Classification Search ........................ None
See application file for complete search history.

(56) References Cited

U.S. PATENT DOCUMENTS

| | | | | |
|---|---|---|---|---|
| 5,583,983 A * | 12/1996 | Schmitter | ...................... | 717/138 |
| 6,058,396 A * | 5/2000 | Birze et al. | ..................... | 719/331 |
| 6,848,099 B2 * | 1/2005 | Harrison et al. | ............... | 717/151 |
| 6,907,572 B2 * | 6/2005 | Little et al. | ..................... | 715/762 |
| 6,986,143 B2 * | 1/2006 | Cole et al. | ...................... | 719/315 |
| 7,024,665 B2 * | 4/2006 | Ferraz et al. | ................... | 717/136 |
| 7,093,242 B2 * | 8/2006 | Bernadat et al. | ............... | 717/166 |
| 7,168,065 B1 * | 1/2007 | Naccache et al. | ............. | 717/127 |
| 7,293,259 B1 * | 11/2007 | Dmitriev | ........................ | 717/127 |
| 7,293,260 B1 * | 11/2007 | Dmitriev | ........................ | 717/127 |
| 7,373,642 B2 * | 5/2008 | Williams et al. | ............... | 717/159 |
| 7,398,426 B2 * | 7/2008 | Colyer | ............................... | 714/38 |
| 7,430,733 B1 * | 9/2008 | Yaari | .............................. | 717/151 |
| 7,454,745 B2 * | 11/2008 | Aridor et al. | ................... | 717/136 |
| 7,487,228 B1 * | 2/2009 | Preslan et al. | ................. | 709/219 |
| 7,487,494 B2 * | 2/2009 | Chan et al. | .................... | 717/127 |
| 7,496,897 B1 * | 2/2009 | Dibble et al. | ................. | 717/127 |
| 7,526,760 B1 * | 4/2009 | Daynes et al. | ................ | 717/159 |
| 7,533,246 B2 * | 5/2009 | Taylor | ........................... | 717/136 |

(Continued)

OTHER PUBLICATIONS

Geoff A. Cohen, et al. "Automatic Program Transformation with JOIE", 1998, ATEC '98 Proceedings of the annual conference on USENIX Annual Technical Conference, pp. 1-12.*

(Continued)

*Primary Examiner* — Thuy Dao
*Assistant Examiner* — Xi D Chen
(74) *Attorney, Agent, or Firm* — Osha Liang LLP

(57) ABSTRACT

A mechanism is disclosed for enabling a set of code intended to be executed on a first platform (intended platform) to be executed on another platform (target platform). In one implementation, this mechanism takes a significantly different approach than that taken by current techniques. Rather than duplicating, augmenting, or changing a platform to accommodate the set of code, this mechanism alters the set of code to accommodate the platform. By altering the set of code, the mechanism causes the set of code to compensate for the difference(s) between the intended platform and the target platform. By compensating for the difference(s) in the two platforms, the set of code, when executed on the target platform, is able to produce the same result or results as it would have produced had it been executed on the intended platform. Thus, the set of code is able to execute properly on the target platform.

10 Claims, 3 Drawing Sheets

U.S. PATENT DOCUMENTS

| | | | | |
|---|---|---|---|---|
| 7,543,285 B2 * | 6/2009 | Cabillic et al. | | 717/159 |
| 7,581,215 B1 * | 8/2009 | Song et al. | | 717/159 |
| 7,603,663 B2 * | 10/2009 | Wu et al. | | 717/151 |
| 7,664,967 B2 * | 2/2010 | Thorpe | | 717/127 |
| 7,761,848 B1 * | 7/2010 | Chaffin | | 717/116 |
| 7,774,757 B1 * | 8/2010 | Awasthi et al. | | 717/127 |
| 7,793,272 B2 * | 9/2010 | Andrews et al. | | 717/136 |
| 7,810,082 B2 * | 10/2010 | Levenshteyn | | 717/141 |
| 8,291,393 B2 * | 10/2012 | Gallop et al. | | 717/159 |
| 2002/0093856 A1 * | 7/2002 | Baentsch et al. | | 365/200 |
| 2002/0133501 A1 * | 9/2002 | Raduchel et al. | | 707/102 |
| 2004/0267804 A1 | 12/2004 | Fresko et al. | | |
| 2005/0149914 A1 * | 7/2005 | Krapf et al. | | 717/136 |
| 2005/0155024 A1 * | 7/2005 | Wannamaker et al. | | 717/151 |
| 2007/0198973 A1 * | 8/2007 | Choi et al. | | 717/151 |
| 2008/0222607 A1 * | 9/2008 | Gan et al. | | 717/124 |

OTHER PUBLICATIONS

Andrei Popovici, et al. "Dynamic Weaving for Aspect-Oriented Programming", 2002, ACM, pp. 1-7.*

Shigeru Chiba, "Load-Time Structural Reflection in Java", 2000 SpringerLink; [retrieved on Aug. 25, 2011]; Retrieved from Internet <URL:http://www.springerlink.com/content/56tk9mnwk9hqm6jl/fulltext.pdf>; pp. 313-336.*

Tanter, et. al., "Partial Behavioral Reflection: Spatial and Temporal Selection of Reification", 2003 ACM; [retrieved on Aug. 25, 2011]; Retrieved from Internet <URL:http://dl.acm.org/citation.cfm?id=949305.949309>; pp. 27-46.*

David Flanagan, "Java in a nutshell", 1999, O'Reilly; [retrieved on Aug. 25, 2011]; Retrieved from Internet <URL:http://docstore.mik.ua/orelly/java-ent/jnut/ch14_01.htm>; pp. 1-9.*

Rlph Keller, et al. "Supporting the Integration and Evolution of Components Through Binary Component Adaptation", Sep. 9, 1997, Tech. Report TRC97-1. Dept. of Computer Science, Univ. of California, Santa Barbara. pp. 1-12.*

Gonzalez, "Transactional Contexts"; 2009, ACM; [retrieved on Dec. 21, 2012]; Retrieved from Internet <URL:http://dlacm.org/citation.cfm?id=1562112>;pp. 1-6.*

Fabre, Perennou, "A Metaobject Architecture for Fault-Tolerant Distributed Systems: The FRIENDS Approach"; 1998, IEEE; [retrieved on Dec. 21, 2012]; Retrieved from Internet <URL:http://ieeexplore.ieee.org/stamp/stamp.jsp?tp=&arnumber=656088>;pp. 78-95.*

Hu, Gadapa, "Compiling C++ Programs to Java Bytecode"; 2005, IEEE; [retrieved on Dec. 21, 2012]; Retrieved from Internet <URL:http://ieeexplore.ieee.org/stamp/stamp.jsp?tp=&arnumber=1434867>;pp. 1-6.*

Center of Experimental Research in Comp. Science (CERCS), College of Computing Georgia Institute of Technology, entitled "J-Orchestra: Automatic Java Application Partitioning" by Eli Tilevich and Yannis Smaragdakis, (27 pgs) http://j-orchestra.org.

O'Reilly On Java.com™, O'Reilly Network, entitled "Juggle Your Java with JDistro" by Howard Wen, dated Mar. 13, 2007, (3 pgs) http://www.onjava.com.

Statement from Inventor Kenneth Russell (1 pg).

* cited by examiner

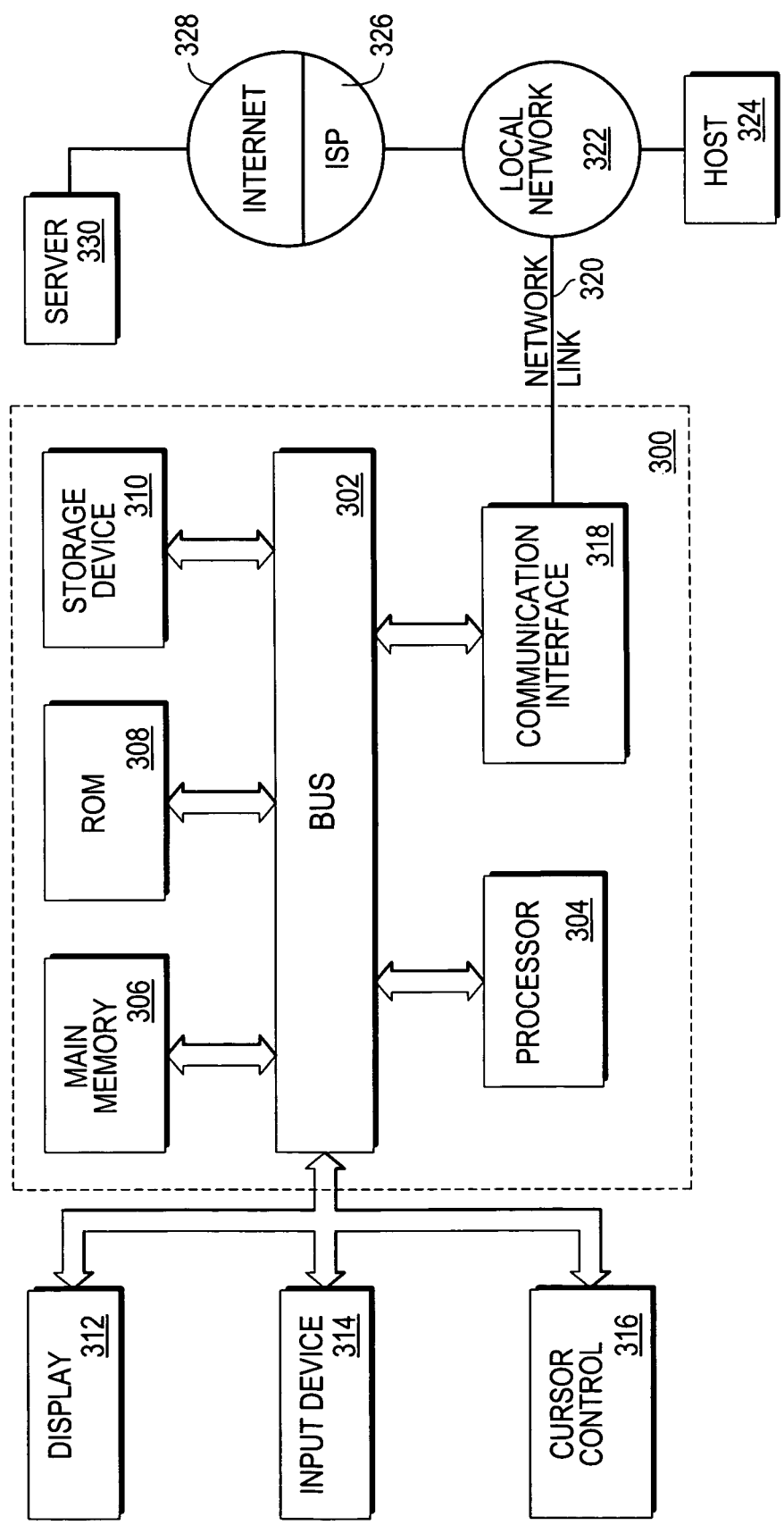

PROCESSING ENGINE FOR ENABLING A SET OF CODE INTENDED FOR A FIRST PLATFORM TO BE EXECUTED ON A SECOND PLATFORM

BACKGROUND

The Java programming language enables a programmer to write an application in a single language, and have that application run on various different sets of hardware. So long as a set of hardware has a compatible Java platform executing thereon, it will be able to execute the application. A Java platform typically includes a Java virtual machine (JVM) and a set of application programming interfaces (API's). The API's may be invoked by the application to implement many low level and perhaps even high level functions.

Currently, there are three major Java platforms, each of which targets a different domain. The Java enterprise edition (EE) platform targets enterprise scale systems having large amounts of resources (e.g. large number of processors, large amount of memory and storage, etc.). The Java standard edition (SE) platform targets standard systems, such as desktops and laptops, having standard amounts of resources. The Java micro edition (ME) platform targets smaller devices, such as cell phones, personal digital assistants (PDA's), set top boxes, etc., which have limited processing capabilities and limited memory and storage. The API's available in a sub platform are largely a subset of the API's available in a higher level platform. For example, the API's available in the SE platform are largely a subset of the API's available in the EE platform, and the API's available in the ME platform are largely a subset of the API's available in the SE platform. Thus, not all API's are available on all Java platforms. In addition to these API differences, the behavior of the API's may also differ from platform to platform. For example, both the SE platform and the ME platform may provide a method X, but the behavior of method X may be different on SE than it is on ME. Because of these differences, it is typically not possible for an application written and intended for one platform to be executed on another platform. If it were executed on the unintended platform, the application would most likely not produce the same intended results.

In some implementations, it would be desirable for an application written for one platform to be executed on another platform. For example, it has been noticed that, in many instances, it would be advantageous to be able to execute an application written for the ME platform (i.e. an ME application) on the SE platform. To accommodate this, the prior art has taken several approaches. A first approach provides both platforms on the same machine. If an ME application is executed, then the ME platform is executed to support the ME application. If an SE application is executed, then the SE platform is executed to support the SE application. This approach is undesirable because it requires the porting of both platforms onto the same machine, and it is inefficient to execute different platforms to support different applications. Another approach changes the underlying platform to support the execution of different applications. For example, the SE platform may be changed to check for the platform for which an application is intended. If the application is intended for the ME platform, then a first set of API's are implemented, and if the application is intended for the SE platform, then a second set of API's are implemented. This approach is undesirable because it is quite intrusive (the platform has to be extensively changed) and because it would add significant overhead.

As the above discussion shows, the current approaches have significant drawbacks. As a result, a need exists for an improved approach for enabling a set of code intended for a first platform to be executed on another platform.

SUMMARY

In accordance with one embodiment of the present invention, there is provided an improved mechanism for enabling a set of code intended to be executed on a first platform (an intended platform) to be executed on another platform (a target platform). In one embodiment, this mechanism takes a significantly different approach than that taken by previous techniques. Rather than duplicating, augmenting, or changing the target platform to accommodate the set of code, this mechanism alters the set of code to accommodate the target platform. By altering the set of code, the mechanism causes the set of code to compensate for the difference(s) between the intended platform and the target platform. By compensating for the difference(s) in the two platforms, the set of code, when executed on the target platform, is able to produce the same result or results as it would have produced had it been executed on the intended platform. Thus, the set of code is able to execute properly on the target (unintended) platform.

In one embodiment, the mechanism (referred to herein as the rewriting module) processes a set of code as follows. When a set of code (e.g. a class) is loaded into a system to be executed, the rewriting module checks the set of code to determine whether it contains any invocations of functionalities (e.g. regular methods, constructor methods, etc.) that are provided by both the intended platform and the target platform but have different behaviors on the target platform than on the intended platform. If the rewriting module determines that the set of code does contain an invocation of such a functionality, it alters at least a portion of the set of code to compensate for the difference in behavior of that functionality. In one embodiment, the rewriting module may alter the set of code by inserting one or more invocations of one or more helper functionalities (e.g. helper methods), by replacing the invocation of the functionality with one or more invocations of one or more substitute functionalities, or by some other means. In one embodiment, the rewriting module finds, in the set of code, each invocation of a functionality that is provided by both platforms but which has a different behavior on the target platform than on the intended platform, and alters the set of code accordingly. By doing so, the rewriting module compensates for the differences in behavior between the two platforms, and enables the set of code, when executed on the target platform, to produce the same result or results as it would have produced had it been executed on the intended platform.

The above operations handle the behavioral differences between the common functionalities that are provided by both platforms. In addition to taking care of the behavioral differences, the rewriting module may also detect and compensate for other platform differences. For example, if the target platform provides access to entities (e.g. classes, methods, fields, etc.) that cannot be accessed on the intended platform, then the rewriting module may alter the set of code to ensure that these entities are not accessed on the target platform. Also, the target platform may allow certain actions that are not allowed on the intended platform. The rewriting module may alter the set of code to ensure that these actions are not taken on the target platform. Overall, the rewriting module may alter the set of code in any desired way to compensate for any differences between the target platform and the intended platform. This in turn enables the set of code, when executed on the target platform, to produce the same result or results as it would have produced had it been executed on the intended platform.

In one embodiment, the rewriting module is implemented as a generic processing engine. The processing engine receives the set of code, and accesses a set of data that includes at least one directive. The directive specifies an operation to be performed on the set of code and a set of additional information. The set of additional information comprises information indicating one or more conditions to be satisfied before the operation is performed on the set of code. In response to encountering the directive in the set of data, the processing engine determines whether the one or more conditions are satisfied. In response to a determination that the one or more conditions are satisfied, the processing engine performs the operation on the set of code to alter the set of code in such a manner that when the set of code, as altered, is executed on the second platform, it produces the same results as would be produced if the set of code were executed unaltered on the first platform. With such a processing engine, the code alteration approach is quite extensible. To perform more operations, or to perform different operations, all that needs to be done is to provide a different set of directives to the processing engine. The code of the processing engine does not need to be changed (the only time the code of the processing engine has to change is if logic needs to be added to enable the processing engine to process more types of directives). Thus, the same processing engine can be used to perform code alteration to enable any set of code intended to execute on any platform to be executed on any other platform.

BRIEF DESCRIPTION OF THE DRAWINGS

FIG. 3 is a block diagram of a general purpose computer system in which one embodiment of the present invention may be implemented.

DETAILED DESCRIPTION OF EMBODIMENT(S)

System Overview

Figure 1:
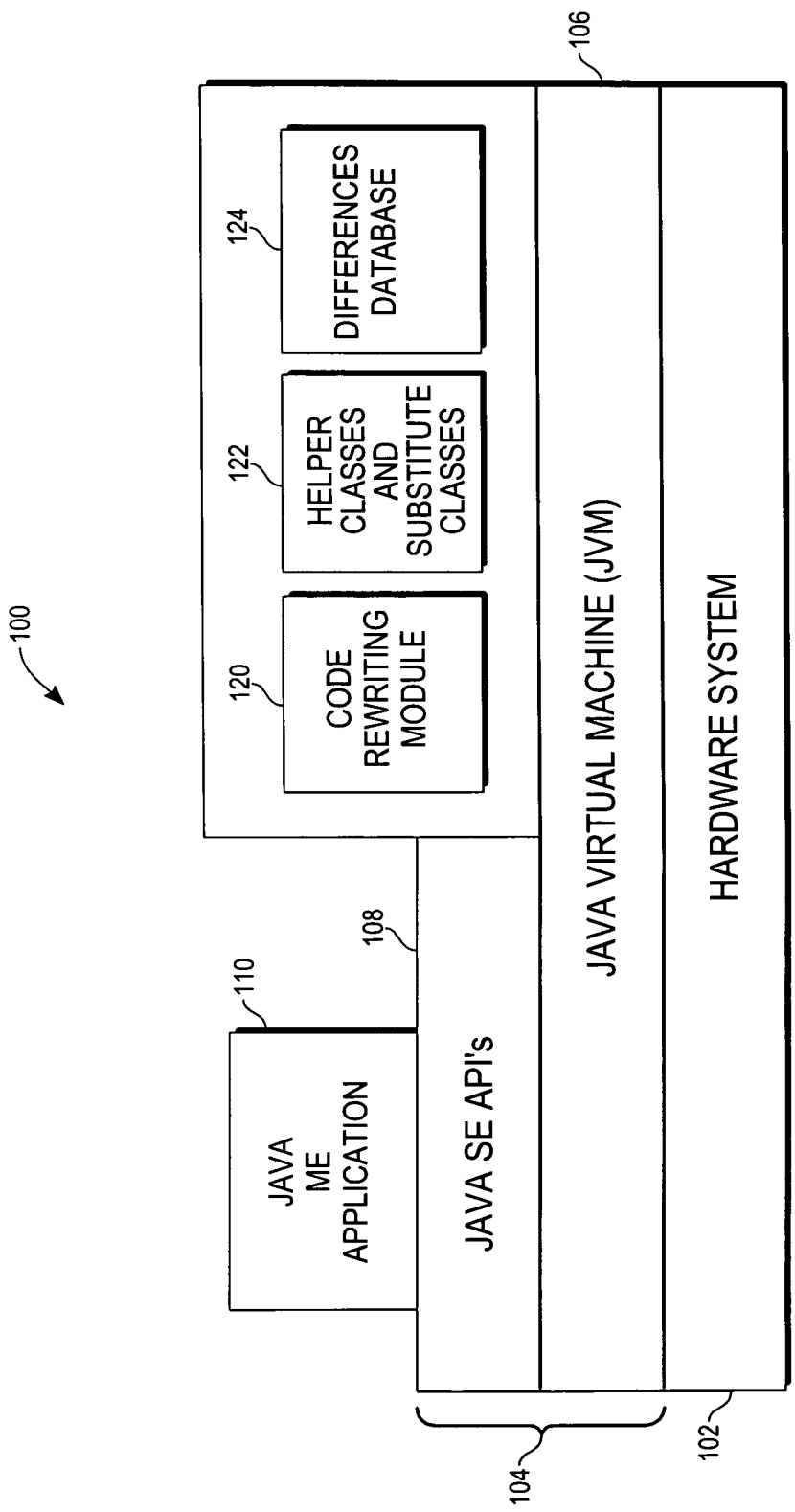
FIG. 1 is a functional block of a system in which one embodiment of the present invention may be implemented.

With reference to FIG. 1, there is shown a functional block diagram of a system 100 in which one embodiment of the present invention may be implemented. In the following sections, reference will be made to an example in which an application written for and intended to execute on a Java ME platform is enabled to execute on a Java SE platform. It should be noted that reference to the Java ME and Java SE platforms is made for illustrative and contextual purposes only. The invention is not so limited. Rather, the concepts taught herein may be applied generally to any platforms and any implementations in which it is desirable to enable a set of code intended to be executed on one platform to be executed on another platform (the concepts may also be applied to enable a set of code intended to be executed on one version of a platform to be executed on another version of the same platform).

As shown in FIG. 1, system 100 comprises a hardware system 102 and a Java SE platform 104 executing thereon. For purposes of the present invention, the hardware system 102 may be any computer system having the necessary resources (e.g. processor(s), memory, storage, etc.) to execute a platform. An example of a hardware system is shown in FIG. 3, which will be described in a later section.

The Java platform 104 comprises a Java virtual machine (JVM) 106 and a set of Java SE application programming interfaces (API's) 108. The JVM 106 provides the foundation and low level functionalities needed for supporting the execution of Java applications. For example, the JVM 106 includes an interpreter for interpreting and executing Java bytecodes. The JVM 106 also includes a just-in-time (JIT) compiler for selectively compiling bytecodes into native code. The JVM 106 further comprises mechanisms for loading classes, managing threads, performing memory management, etc. Overall, the JVM 106 provides the underlying foundation for enabling Java applications to be executed.

The API's 108 provide additional functionalities that can be invoked by an application. In one embodiment, the API's 108 comprise a plurality of classes, with each class having zero or more methods that can be invoked by an application and zero or more fields or attributes. An application may subclass one or more classes of the API's 108. An application may also invoke one or more methods of one or more classes of the API's 108. Overall, the API's 108 provide resources that can be invoked and exploited by a Java application. As shown in FIG. 1, the API's 108 are part of the Java SE platform 104; thus, they conform to the Java SE specification.

The Java application 110 executes on top of the SE API's 108 and the JVM 106. As shown in FIG. 1, the application 110 is an ME application, which means that it was written for and intended to execute on the Java ME platform (i.e. the application 110 was written with the intention of invoking the API's of the Java ME platform). Nonetheless, in the system 100 of FIG. 1, the Java ME application 110 is able to execute on the Java SE platform 104 and still produce the same results as if it had been executed on the Java ME platform. For the sake of simplicity, only one ME application 110 is shown in FIG. 1; however, it should be noted that, if so desired, multiple ME applications may be executed concurrently on the Java SE platform 104. Also, one or more SE applications (applications written for and intended to execute on the Java SE platform) may be executed on the Java SE platform 104 concurrently with the one or more ME applications. These and other implementations are within the scope of the present invention.

The ME application 110 may and most likely does contain a number of invocations of functionalities (e.g. methods) that are provided by both the ME platform and the SE platform 104 but that have different behaviors on the SE platform 104 than on the ME platform. Also, the ME application 110 may try to access entities (e.g. class, method, field, etc.) that are provided by the SE platform 104 but not by the ME platform. If these invocations and accesses are allowed to take place unchanged, then the ME application 110 may and most likely will exhibit different behavior and produce different results than if the application 110 had been executed on the ME platform. To prevent this from happening, a code rewriting module 120 is provided. In one embodiment, it is the rewriting module 120 that alters the code in the ME application 110 to compensate for the differences between the ME platform (the intended platform) and the SE platform (the target platform) 104. By compensating for the differences between the two platforms, the rewriting module 120 enables the ME application 110 to execute on the SE platform 104 and still produce the same result or results as if the ME application 110 had been executed on the ME platform.

In altering the code of the ME application 110, the rewriting module 120 may perform various actions. For example, the rewriting module 120 may insert into the code an invocation of a helper functionality (e.g. a method in a helper class). The rewriting module 120 may also alter the code by replacing an invocation of a functionality (e.g. a method of a class) provided in the SE API's 108 with an invocation of a substitute functionality (e.g. a method of a substitute class). Furthermore, the rewriting module 120 may alter the code by injecting a substitute class into a class hierarchy. By placing references to these components (e.g. helper classes, substitute classes, etc.) in the code of the ME application 110, the rewriting module 120 causes the ME application 110, when executed on the SE platform 104, to invoke these components. This in turn provides the components with the opportunity to perform some additional work at runtime to compensate for the behavioral differences between the ME platform and the SE platform 104. In one embodiment, the helper classes and substitute classes are provided by a user (e.g. a system administrator) and stored in section 122. These components in section 122 may implement any desired logic to compensate for any behavioral differences between the ME platform and the SE platform 104.

The system 100 further comprises a differences database 124. In one embodiment, this database 124 contains information that can be used to determine the differences between the intended platform (in the current example, the ME platform) and the target platform (in the current example, the SE platform 104). In one embodiment, the differences database 124 specifies all of the API classes that are in the ME platform, all of the available methods in each of these API classes, and all of the accessible fields in these API classes. In addition, the database 124 specifies all of the other relevant differences between the two platforms. For example, the database 124 may specify the methods that are declared to be abstract in the ME platform but not declared to be abstract in the SE platform 104. The database 124 may also specify the methods that are declared final in the ME platform but not declared final in the SE platform 104. The database 124 may further specify the methods that are common to both platforms that have different visibilities (e.g. a method may be public in the SE platform 104 but protected in the ME platform). The database 124 may further specify any differences in class hierarchies between the two platforms. Overall, the database 124 may contain any and all information that the rewriting module 120 may use to determine the differences between the two platforms. Based on the information in database 124, the rewriting module 120 can determine, at least in part, how to alter the code of the ME application 110 to compensate for the platform differences. For purposes of the present invention, the differences database 124 may be created in any desired manner. For example, the database 124 may be manually populated. Alternatively, it may be generated automatically by a comparison mechanism (not shown) that compares the specification of the ME platform against the specification of the SE platform 104. These and other methods may be used to generate the differences database 124.

In the example shown in FIG. 1, there is only one differences database 124, which specifies the differences between the ME platform and the SE platform 104. It should be noted that the system 100 may comprise additional databases. For example, if it is desired to be able to execute an application intended for platform Z on the SE platform 104, then the system 100 may include another database (not shown) that sets forth the differences between the Z platform and the SE platform 104. In general, there may be a differences database for each pair of different platforms. This and other extensions are within the scope of the present invention.

Overview of Rewriting Module Operation

In one embodiment, the rewriting module 120 processes and potentially alters a set of code when that set of code is loaded for execution during runtime. In the context of a Java application, which is a collection of classes, the rewriting module 120 alters the code for a class when that class is loaded for execution (a class is typically loaded when it is first referenced). In Java, the loading of a class may involve one or more class loaders. For example, suppose that a system has class loaders B, A, and system class loader, and that class loader B delegates to class loader A which delegates to system class loader. When class loader B receives a request to load a class, it will delegate the request to class loader A which in turn will delegate the request to system class loader. If the system class loader is able to load the class, then it will return the class to class loader A which will return the class to class loader B. However, if the system class loader is unable to load the class, then class loader A will try to load the class. If class loader A is able to load the class, then it will return the class to class loader B. If class loader A is unable to load the class, then class loader B will try to load the class. This process continues until either the class is loaded, or it is determined that the class cannot be loaded. In one embodiment, the rewriting module 120 is invoked when the appropriate class loader for loading the class is invoked. That way, the rewriting module 120 will be able to inspect all of the code for that class, and potentially alter the code, if necessary, before it is loaded and executed. In one embodiment, to cause the rewriting module 120 to be invoked at the proper time, the rewriting module 120 is registered with the JVM 106, and the JVM 106 is instructed to invoke the rewriting module 120 when the class loader for loading a class is invoked. So instructed, the JVM 106 will invoke the rewriting module 120 at the proper time. In the embodiment described thus far, the rewriting module 120 is a separate component from the class loader. As an alternative, the functionality of the rewriting module 120 may be incorporated into one or more class loaders. This and other implementations are within the scope of the present invention.

Figure 2:
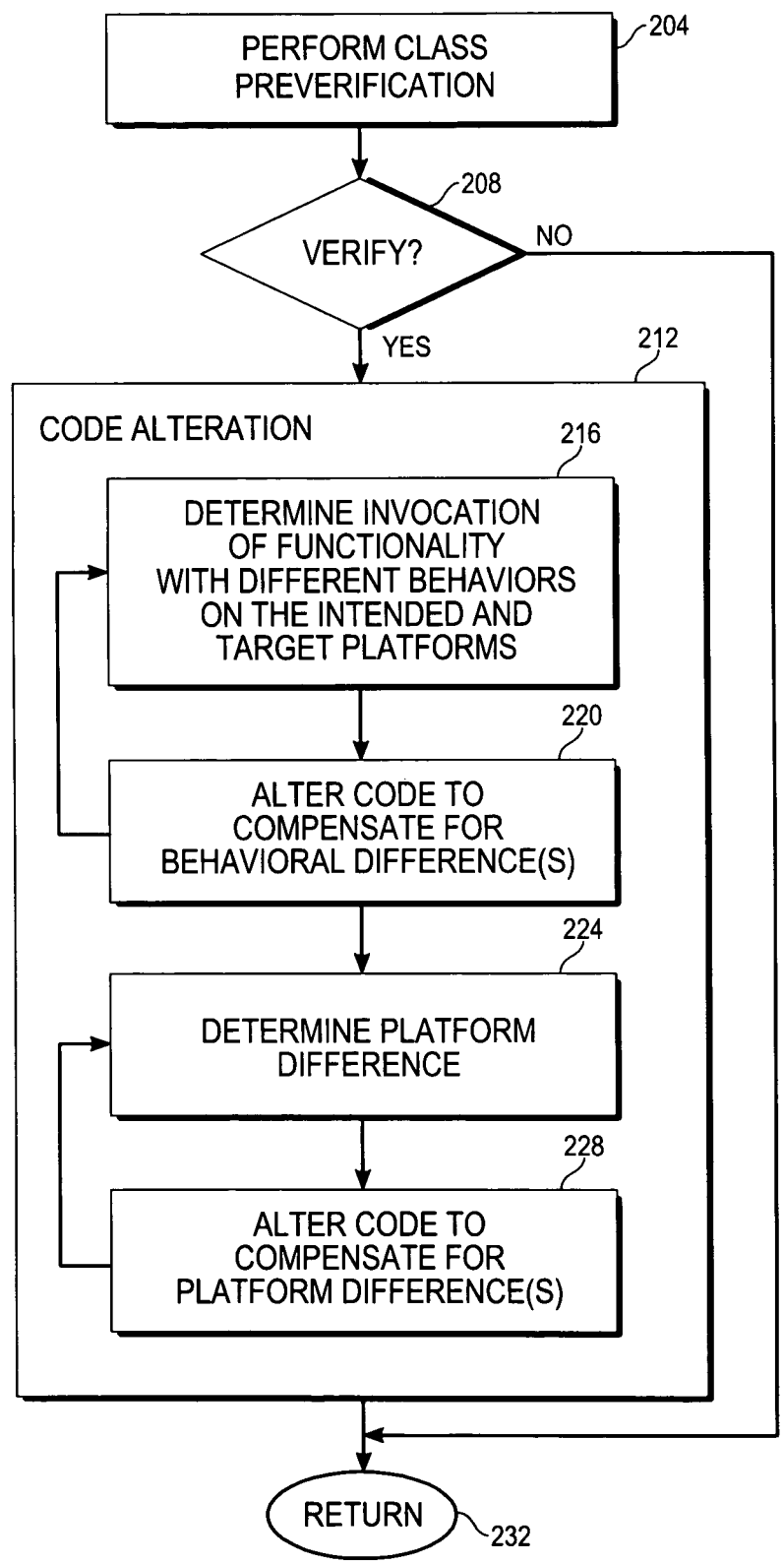
FIG. 2 is an operational flow diagram illustrating the high level operation of a rewriting module, in accordance with one embodiment of the present invention.

FIG. 2 shows an operational flow diagram that depicts the high level operation of the rewriting module 120, in accordance with one embodiment of the present invention. When the rewriting module 120 receives the code for a class (since the class is a Java class, the code would take the form of Java bytecodes), the rewriting module 120 initially performs a verification operation (block 204) on the bytecodes to determine whether the class is a well-formed Java class. The requirements for a well-formed Java class are well known and will not be elaborated upon herein. Normally, the verification function is left to the JVM 106 to perform. However, it has been observed that in the process of altering a set of bytecodes, the rewriting module 120 may correct some or all of the aspects that cause a class to not be well-formed. Thus, the rewriting module 120 may turn a non well-formed class into a well-formed class. In one embodiment, this is not a desirable result. If a Java class is initially not well-formed, it should be rejected and the rewriting module 120 should not change that result. Because of this consideration, the rewriting module 120 performs its own verification operation. If the rewriting module 120 determines (block 208) that the class is well-formed, then it will proceed to the code alteration portion 212 of its operation. If the rewriting module 120 determines that the class is not well-formed, then it will skip the code alteration portion 212 and return to allow the class to be loaded. At some point, the JVM 106 will perform a verification operation on the class, determine that it is not a well-formed class, and reject it.

Assuming that the class is a well-formed class, the rewriting module 120 proceeds to perform code alteration (if necessary) on the bytecodes of that class. In one embodiment, code alteration 212 includes two phases. One phase looks for and compensates for the behavioral differences between the intended platform (ME) and the target platform (SE). In this phase, the rewriting module 120 processes the bytecodes of the class to determine (block 216) or look for any invocation of any functionality that is provided by both the ME and the SE platforms but which has different behavior on the SE platform than on the ME platform. If an invocation of such a functionality is found, then the rewriting module 120 alters (block 220) at least a portion of the bytecodes of the class to compensate for the behavioral difference(s) of the functionality. This may involve inserting into the bytecodes one or more invocations of one or more helper methods of one or more of the helper classes in section 122, or replacing the invocation of the functionality with one or more invocations of one or more methods of one or more of the substitute classes in section 122, or injecting a substitute class into a class hierarchy, etc. These and other actions may be taken to alter the bytecodes of the class. As shown by the arrow from block 220 to 216, this process in one embodiment is iterative. Thus, the rewriting module 120 finds, in the bytecodes of the class, each invocation of a common but differently behaving functionality, and alters the bytecodes accordingly. In order to perform these operations, the rewriting module 120 has to know which functionalities are common to both platforms but have different behaviors on the different platforms, and it also has to know how to alter the bytecodes in response to finding invocations of such functionalities. This knowledge may be hardcoded into the logic of the rewriting module 120, or it may be provided to the rewriting module 120 in the form of data or configuration information. One embodiment of the rewriting module 120, which uses data, will be described in a later section. After all such invocations are found and compensated for, the behavioral differences between the two different platforms are handled for the class.

Another phase of code alteration looks for and compensates for API or platform differences between the intended platform and the target platform. For example, the SE platform may provide classes, methods, fields, etc. that the ME platform does not provide. Also, some methods may be declared abstract in ME that are not abstract in SE, some methods may be declared to be final in ME that are not final in SE, some methods in ME may have different visibilities than those same methods in SE, etc. The rewriting module 120 determines (block 224) or looks for these and other platform differences and alters (block 228) the bytecodes of the class to compensate for such differences. As shown by the arrow from block 228 to 224, this process in one embodiment is iterative. Thus, the rewriting module 120 finds each such difference, and alters the bytecodes of the class accordingly. In order to perform these operations, the rewriting module 120 has to know what differences there are between the intended platform and the target platform, and it has to know how to alter the bytecodes in response to each difference. In one embodiment, the differences between the two platforms are set forth in the differences database 124, and the knowledge of how to alter the bytecodes is hardcoded into the logic of the rewriting module 120. This is just one possible implementation; other implementations are possible (e.g. knowledge of the platform differences may also be hardcoded into the rewriting module 120, knowledge of how to alter the bytecodes may be provided as data or configuration information to the rewriting module so that they are not hardcoded into the rewriting module, etc.). All possible implementations are within the scope of the present invention.

By processing the bytecodes of the class in the manner described above, the rewriting module 120 ensures that when the class is executed on the target SE platform, it will produce the same result or results as it would have produced had it been executed on the intended ME platform. After the class is processed, the rewriting module 120 returns, and the class (as altered) is allowed to be loaded and executed.

The above discussion provides a high level overview of the operation of the rewriting module 120. The detailed operation of one possible embodiment of the rewriting module 120 will now be described.

Handling Behavioral Differences

In altering the bytecodes of a class to compensate for the behavioral differences between the intended platform and the target platform, the rewriting module 120, in one embodiment, performs six basic types of operations. Each of these will be discussed below.

Pre-Constructor Argument Check

As noted previously, in one embodiment, the rewriting module 120 processes the bytecodes of a class when that class is loaded. The bytecodes of the class being loaded (hereinafter, the loading class) may reference other classes and may invoke the constructor methods of those classes. Often, when a constructor method (also referred to herein as a constructor) is invoked to initialize a newly created object instance, one or more arguments may be passed to the constructor. For some constructors, the permissible values of the arguments may differ from platform to platform. For example, for a particular argument for a particular constructor, the ME platform may allow one range of values (e.g. positive values) while the SE platform 104 may allow a different range of values (e.g. positive and negative values). To ensure that only the proper values are allowed to be passed to the constructor when the constructor is invoked in the SE platform 104, the rewriting module 120, in one embodiment, adds a pre-constructor argument check to the bytecodes of the loading class. This argument check is inserted into the bytecodes at a point after the value of the argument is established but before the constructor is invoked. The argument check may perform any desired processing on the argument before that argument is passed to the constructor. In one embodiment, the argument check takes the form of an invocation of one of the helper methods of one of the helper classes in section 122 (FIG. 1). The logic implemented by the helper method performs the proper processing for the appropriate constructor. Different helper methods may be invoked for different constructors.

To illustrate how this may be done, reference will be made to an actual example. The class Java.math.BigDecimal has a constructor which takes in an integer scale as one of its arguments. In the ME platform, the integer scale is limited to being a positive value. In the SE platform 104, however, there is no such limitation. To ensure that the loading class will produce the same results when it is executed on the target SE platform 104 as when it is executed on the intended ME platform, the rewriting module 120 inserts into the loading class a call to a helper method of one of the helper classes in section 122. This call is inserted at a point after the value of the integer scale argument is established but before the constructor is called. The integer scale argument is passed to the helper method as an argument. The logic of the helper method checks the value of the integer scale argument. If the integer scale argument has a negative value (which is not allowed on the intended ME platform), then the helper method causes a NumberFormatException to be thrown, which is the exact result that would be derived if the loading class were executed on the intended ME platform. If the integer scale has a non negative value, then the helper method simply returns and the integer scale argument is allowed to be passed on to the constructor. By adding the invocation of the helper method to the bytecodes of the loading class in this manner, the rewriting module 120 compensates for the different behavior of the constructor on the different platforms, and enables the loading class, when executed on the target SE platform 104, to produce the same results as if it were executed on the intended ME platform.

Post-Constructor Object Check

In some cases, the constructor of a class may function differently on the target platform than it does on the intended platform, and as a result, may produce an object that is different than what would be produced on the intended platform. In such a case, some post processing may need to be performed on the object to ensure that it is the same as that which would be produced on the intended platform. To enable this post processing to be done, the rewriting module 120, in one embodiment, adds a post-constructor object check to the bytecodes of the loading class. In one embodiment, this object check is inserted into the bytecodes at a point immediately after the invocation of the constructor. The object check may perform any desired processing on the object initialized by the constructor to change the object in any desired way. In one embodiment, the object check takes the form of an invocation of one of the helper methods of one of the helper classes in section 122 (FIG. 1). The object initialized by the constructor is passed to the helper method as an argument. The logic implemented by the helper method performs the proper processing on the object, and returns an object that is the same as what would be produced by the intended platform. Different helper methods may be invoked for different constructors.

To illustrate how this may be done, reference will be made to an actual example. The java.util.Random no-argument constructor produces an object that is seeded with a certain seed value. In the ME platform, the constructor obtains the seed value by calling System.currentTimeMillis( ). In the SE platform 104, however, the constructor obtains the seed value by other means. To ensure that the loading class will get the same object with the same seed value when it is executed on the target SE platform 104 as when it is executed on the intended ME platform, the rewriting module 120 inserts into the loading class a call to a helper method of one of the helper classes in section 122. This call is inserted at a point immediately after the constructor is invoked. The object initialized by the constructor is passed to the helper method as an argument. The logic of the helper method calls System.currentTimeMillis( ) to obtain a seed value. The helper method then calls the Random.setSeed( ) method of the object instance and passes the seed value to it. By doing so, the helper method causes the object to be seeded with the value provided by System.currentTimeMillis( ), which is the same result as would be produced if the loading class were executed on the ME platform. By adding the invocation of the helper method to the bytecodes of the loading class in this manner, the rewriting module 120 compensates for the different behavior of the constructor on the different platforms, and enables the loading class, when executed on the target SE platform 104, to produce the same results as if it were executed on the intended ME platform.

Rewrite Non Static Method Call

The bytecodes of a loading class may contain non static method calls (a non static method call is a method call that targets a certain receiver object) that produce different results on the target platform than on the intended platform. Examples of such methods are the "reflective" methods that can be called in the Java platforms. In Java, it is possible to call one or more reflective methods on an object to obtain information about that object. For example, by calling reflective methods, it is possible to ascertain the class of an object, the methods that can be invoked on that object, the fields that can be accessed in the object, etc. Unfortunately, the information that should be exposed about an object may differ from platform to platform. For example, an object of a particular class in the ME platform may have only methods X and Y while an object of that same class in the SE platform may have methods X, Y, and Z. If reflection is invoked in ME, only the X and Y methods would be returned. However, if reflection is invoked in SE, the X, Y, and Z methods would be returned. Thus, the same reflective method invoked on the different platforms may cause different results to be produced.

To compensate for this, the rewriting module 120 may replace the non static method call in the bytecodes of the loading class with a static method call to one of the substitute methods of one of the substitute classes in section 122 (FIG. 1). To convert the non static method call to a static method call, the rewriting module 120 passes the receiver object to the substitute method as part of the method call. The substitute method may implement any logic to perform any processing needed to ensure that when the substitute method is executed on the target platform, it will produce the same results as the original method would produce when executed on the intended platform. The substitute method may call the original method and perform additional operations before and/or after the call, or it may implement completely different logic. Different substitute methods may be invoked for different method calls. In the reflection example given above, the substitute method may consult the differences database 124 to determine what methods of the particular class are exposed in the ME platform, and return only those methods. By doing so, the substitute method ensures that when the bytecodes of the loading class are executed on the target SE platform 104, they will produce the same results as would have been produced had the unaltered loading class been executed on the intended ME platform.

Rewrite Static Method Call

This type of operation is very similar to the "rewrite non static method call" type of operation discussed above. In fact, it is simpler because there is no need to convert a non static method call to a static method call. The discussion provided above for the "rewrite non static method call" type of operation also applies here.

Rewrite Static Field Access

In some rare cases, the bytecodes of a loading class may reference a static field in a particular holder class. The value in this static field may differ from platform to platform. To account for this difference, the rewriting module 120 changes the bytecodes of the loading class so that the reference to the static field in the particular holder class is changed to reference a static field in one of the helper classes in section 122 instead. The static field in the helper class has the proper value.

Rewrite Superclass

In some cases, it may be desirable to completely substitute another class for a class that is currently in the target platform. Doing so allows a user (e.g. an administrator) to make wholesale behavioral changes. With this ability to make wholesale changes, if the user wishes to change the behavior of a constructor of a class, or wishes to change the behavior of a method of a class, the user can substitute a substitute class for that class, and provide the desired constructor and/or method with the desired behavior in the substitute class. Overall, substituting a substitute class for another class provides an alternative mechanism for achieving all of the objectives achievable by the previously described types of operations. Depending on the particular circumstances, one type of operation may be better than another, or one type of operation may not be available. For example, in the case where a class has been declared to be final, the substitute class operation may not be able to be implemented (as will be made clear by the following discussion).

In practice, it may not be desirable or possible to actually substitute (i.e. replace) one class with another class. However, the same effect can be achieved by injecting the substitute class into a class hierarchy so that the substitute class becomes a subclass of the "replaced" class (this is why the substitute class operation cannot be used where the replaced class has been declared to be final because in that case, the replaced class cannot be subclassed). For example, suppose that it is desired to substitute a class B for a class A. To do so, the substitute class B is declared to be a subclass of class A. In addition, all classes that subclass class A are caused to subclass class B instead (in effect, class B is injected into the class hierarchy). Furthermore, all attempts to create an instance of class A are changed to create an instance of class B instead. By performing all of these operations, the platform class A is effectively replaced by the substitute class B.

In one embodiment, to implement the class substitution procedure described above, the rewriting module 120 performs the following operations. When the rewriting module 120 obtains the bytecodes for a loading class, it searches the bytecodes for all bytecodes that create a new instance of the replaced class. In each of these bytecodes, the rewriting module replaces the reference to the replaced class with a reference to the substitute class (thus, an instance of the substitute class will be created instead of an instance of the replaced class). The rewriting module 120 also searches for all bytecodes that invoke any constructor of or perform a superclass method call on the replaced class. In each of these bytecodes, the rewriting module 120 replaces the reference to the replaced class with a reference to the substitute class. Furthermore, the rewriting module 120 searches for all bytecodes in which a class tries to subclass the replaced class. For each class that tries to subclass the replaced class, the rewriting module 120 changes the declared superclass of that class to indicate the substitute class instead of the replaced class. Thus, it is the substitute class that is subclassed instead of the replaced class. By performing these operations, the rewriting module 120 causes the replaced class to effectively be replaced by the substitute class.

Handling Platform Differences

The types of operations described above compensate for the behavioral differences between the intended platform and the target platform. In addition to compensating for behavioral differences, the rewriting module 120, in one embodiment, also compensates for other platform differences. Compensation for these platform differences will be discussed below.

References to Inaccessible Classes

In some cases, even though the ME application 110 was written for and intended to execute on the ME platform, it may contain bytecodes that try to access classes that are provided by the SE platform 104 but not provided by the ME platform (e.g. the programmer may have made an error). If the application 110 with such an error is executed on the ME platform, the ME platform would raise a NoClassDefFoundError. However, if the same application 110 is executed on the SE platform 104, the SE platform 104 would not raise such an error because the SE platform has such a class. To ensure that the same result is produced on both platforms, the rewriting module 120 alters the code of the application 110.

In one embodiment, when the rewriting module 120 receives the bytecodes for a loading class, it determines whether any of the bytecodes attempt to access a class that is provided by the target SE platform 104 but not provided by the intended ME platform. The rewriting module 120 may make this determination by consulting the differences database 124, which sets forth the differences between the two platforms. If the rewriting module 120 determines that a set of bytecodes is trying to access a class that is provided by the target SE platform 104 but not provided by the intended ME platform, the rewriting module 120 changes the set of bytecodes so that the reference to the class that is provided by the SE platform 104 is replaced with a reference to a class that is known to not be provided by the SE platform 104. For example, a bytecode that references the class javax/swing/JFrame (which is provided by the SE platform 104 but not provided by the ME platform) is changed to reference the class javax/swing/JFrame_inaccessible_to_Java_ME instead. The class javax/swing/JFrame_inaccessible_to_Java_ME is known to not be provided by the SE platform 104. Thus, when this set of bytecodes is executed on the SE platform 104, the SE platform 104 will raise a NoClassDefFoundError. This is the same result as would be produced if the unaltered bytecodes were executed on the ME platform. Thus, by altering the bytecodes in the manner described, the rewriting module 120 causes the application 110, when executed on the SE platform 120, to produce the same results as if the application 110 were executed on the ME platform.

References to Inaccessible Methods and Fields

In the same manner that the ME application 110 may attempt to access classes that are provided by the SE platform 104 but not provided by the ME platform, the ME application 110 may also try to access methods and fields that are accessible in the SE platform 104 but not accessible in the ME platform. In one embodiment, the rewriting module compensates for these errors in the same manner as that described above in connection with classes. Specifically, when the rewriting module 120 receives the bytecodes for a loading class, it determines whether any of the bytecodes attempt to access a method or a class that is accessible in the SE platform 104 but not accessible in the ME platform. The rewriting module 120 may make this determination by consulting the differences database 124. If the rewriting module 120 determines that a set of bytecodes is trying to access a method or a field that is accessible in the target SE platform 104 but not accessible in the intended ME platform, the rewriting module 120 changes the set of bytecodes so that the reference to the method or field that is provided by the SE platform 104 is replaced with a reference to a method or field that is known to not be provided by the SE platform 104. That way, when the bytecodes are executed on the SE platform 104, the SE platform 104 will raise the proper errors (e.g. NoSuchMethodError, NoSuchFieldError). This is the same result as would be produced if the unaltered bytecodes were executed on the ME platform.

References to Inaccessible Constructors

The ME application 110 may attempt to invoke a class constructor that is available in the SE platform 104 but not available in the ME platform. This is a similar error to those described above pertaining to classes, methods, and fields. However, the bytecode verifier in the JVM 106 treats constructor invocations specially, so it is not possible to use the renaming technique described above in connection with inaccessible classes, methods, and fields in the same way for constructors.

In one embodiment, the rewriting module 120 handles inaccessible constructor errors as follows. When the rewriting module 120 receives the bytecodes for a loading class, it determines whether any of the bytecodes attempt to access a constructor that is accessible in the SE platform 104 but not accessible in the ME platform. The rewriting module 120 may make this determination by consulting the differences database 124. If the rewriting module 120 determines that a set of bytecodes is trying to access a constructor that is accessible in the target SE platform 104 but not accessible in the intended ME platform, the rewriting module 120 inserts into the bytecodes of the loading class a call to a helper method of one of the helper classes in section 122 (FIG. 1). This call is inserted into the bytecodes at a point prior to the invocation of the constructor. The logic of the helper method causes a NoSuchMethodError to be thrown. Thus, when these bytecodes are executed on the SE platform 104, the SE platform 104 will raise the proper error. This is the same result as would be produced if the unaltered bytecodes were executed on the ME platform.

Abstract Methods

Certain classes may have one or more of their methods declared as abstract (i.e. the class does not provide any implementation for the abstract method). If a class is a subclass of a class that contains an abstract method, the subclass is required to provide an implementation for the abstract method. For example, if abstract class A has a method X that is declared to be abstract, and if concrete class B is a subclass of class A, then class B is required to provide an implementation for method X. If the subclass does not provide an implementation for the abstract method, and if the method is ever called during execution, an AbstractMethodError will be raised.

There are certain classes in the ME platform that have one or more of their methods declared as abstract. These same classes exist in the SE platform 104 but in the SE platform 104, the methods of these classes are not declared to be abstract. Thus, a subclass in the ME application 110 that fails to provide an implementation for an abstract method may cause an error to be raised when executed on the ME platform (where the method is declared to be abstract) but will not cause an error to be raised when executed on the SE platform 104 (where the method is not declared to be abstract). To cause the ME application 110 to produce the same results when executed on the SE platform 104 as when executed on the ME platform, the rewriting module 120 alters the code of the ME application 110 in the following manner.

Specifically, the rewriting module 120 looks for a class that directly subclasses a class in which a particular method is declared to be abstract in the ME platform but not declared to be abstract in the SE platform 104 (the rewriting module 120 can determine which classes these are from the information in the differences database 124). Upon finding such a subclass, the rewriting module 120 performs the following operations. First, the rewriting module 120 adds a helper method to the subclass. This helper method contains logic for throwing an AbstractMethodError. The rewriting module 120 also determines whether the subclass provides an implementation for the particular method. If the subclass does not provide an implementation for the particular method, then the rewriting module 120 adds an implementation for the particular method to the subclass. This implementation contains logic for calling the helper method that was added to the subclass. Thus, if the ME application 110 is executed on the SE platform 104, and if the particular method in the subclass is ever called, the implementation for the particular method will call the helper method, which in turn, will cause an AbstractMethodError to be thrown. This is the same result as would be produced if the unaltered subclass were executed on the ME platform.

In addition, the rewriting module 120 looks in the subclass's bytecodes for all calls to the superclass's implementation of the particular method. All such calls are changed so that they are redirected to the helper method that was added to the subclass instead. Specifically, each reference to the superclass's implementation of the particular method is replaced with a reference to the helper method. By altering the calls in this manner, the rewriting module 120 causes all invocations of the particular method in the superclass to result in an AbstractMethodError. This is the same result as would be produced if the unaltered subclass were executed on the ME platform.

Final Methods

Some methods may be declared final. If a subclass attempts to override (i.e. provide an implementation for) a final method, a verify error will arise when the subclass is loaded and verified by the JVM 106.

In the ME platform, some methods may be declared final which are not declared final in the SE platform 104. Thus, a subclass in the ME application 110 that tries to override a method may cause an error to be raised when the subclass is loaded on the ME platform (where the method is declared to be final) but may not cause an error to be raised when the subclass is loaded on the SE platform 104 (where the method is not declared to be final). To cause the ME application 110 to produce the same results when executed on the SE platform 104 as when executed on the ME platform, the rewriting module 120 alters the code of the ME application 110 in the following manner.

When the rewriting module 104 determines that a subclass is overriding a method, the rewriting module 120 determines whether the method is one which has been declared final in the ME platform but not declared final in the SE platform 104. The rewriting module 104 can make this determination by consulting the difference database 124. If the rewriting module 104 determines that the subclass is attempting to override a method that has been declared final in the ME platform but not declared final in the SE platform 104, the rewriting module 104 inserts, into the bytecodes of the subclass, an implementation for a method that is known to be final in the SE platform 104. In effect, the rewriting module 104 is injecting into the subclass an override that is known to be illegal in the SE platform 104. That way, when the subclass is loaded and verified on the SE platform 104, it will cause a verify error to be raised. This is the same result as would be produced if the unaltered subclass were executed on the ME platform.

Methods with Differing Visibilities

Some methods may have different visibilities on the ME platform than on the SE platform 104. For example, an API method X may be "protected" on the ME platform but "public" on the SE platform 104. Because of the different visibilities, a method that may not be visible or accessible to a class in the ME platform may be visible and accessible to that same class in the SE platform 104. To compensate for this difference, the rewriting module 120 performs the following operations.

When the bytecodes of a loading class are received, the rewriting module 120 checks the bytecodes for invocations of API methods. For each API method invocation, the rewriting module 120 determines what the visibility of the invoked method would be on the ME (not the SE) platform. This can be done by consulting the difference database 124. The rewriting module 120 then determines, given the above determined visibility, whether the invoked method would be visible and accessible to the loading class. If, given the above determined visibility, the invoked method would not be visible or accessible to the loading class, then the rewriting module 120 inserts into the bytecodes of the loading class a call to a helper method of one of the helper classes in section 122. This call is inserted at a position prior to the API method invocation. The logic of the helper method causes an IllegalAccessError to be raised. By altering the bytecodes of the loading class in this way, when the loading class is executed on the SE platform 104, it will cause an IllegalAccessError to be raised. This is the same result as would be produced if the unaltered loading class were executed on the ME platform.

Classes with Unsupported Version Numbers

When a class is loaded, part of the information contained in its bytecodes may be a version number associated with the loading class. In the SE platform 104, the maximum allowable version number is larger than the maximum allowable version number in the ME platform. If a class having a version number greater than the ME maximum allowable version number is loaded in the ME platform, an UnsupportedClassVersionError would be raised. If that same class is loaded in the SE platform, the UnsupportedClassVersionError might not be raised if the version number of the class is smaller than the maximum allowable version number on the SE platform. To compensate for this potential difference, the rewriting module 120 performs the following operations.

When a class is loaded, the rewriting module 120 determines whether the version number of the loading class is larger than the maximum allowable version number on the ME (not the SE) platform. If so, then the rewriting module 120 changes the version number of the class to a large number that is larger than the maximum allowable version number on the SE platform. That way, when the class is loaded in the SE platform 104 and inspected by the JVM 106, the JVM 106 will see that the version number is not supported, even by the SE platform 104, and will raise an UnsupportedClassVersionError. This is the same result as would be produced if the unaltered loading class were loaded on the ME platform.

Classes Using Reserved Access Flags

As noted above, when a class is loaded, some additional information may be loaded along with the bytecodes of the loading class. Part of this additional information may be a set of access flags. The access flags in the ME platform are a subset of the access flags in the SE platform 104. The additional access flags are not used in the ME platform but may mean something in the SE platform 104. To prevent any potential confusion, when a class is loaded, the rewriting module 120 clears all of the access flags that are not used in the ME platform. That way, when the loading class is loaded in the SE platform 104, it will not contain any information in the additional access flags that may give rise to confusion or different behavior in the SE platform 104.

Generic Engine Implementation of Rewriting Module

The rewriting module 120 may be implemented in various ways. For example, one implementation is to hard code all of the knowledge of the behavioral differences between the two platforms, and all of the knowledge of what to do to compensate for these behavioral differences, into the rewriting module 120. Another implementation is to hardcode into the rewriting module 120 some knowledge on how to perform certain basic operations, and then tell the rewriting module 120, through data (e.g. a configuration file), when to perform these basic operations and on what entities. An embodiment of the latter implementation is described below.

In one embodiment, the rewriting module 120 is implemented as a generic processing engine. This processing engine takes a set of directives (which may, for example, be provided by a user in a configuration file) and iterates through them. For each directive, the processing engine performs one or more operations on one or more bytecodes of a loading class. In one embodiment, there are six types of directives that can be set forth in a set of data. These six types of directives correspond to the six types of operations described in the "Handling Behavioral Differences" section of this disclosure. Thus, there is a PreConstructorArgumentCheck directive, a PostConstructorObjectCheck directive, a RewriteNonStaticMethodCall directive, a RewriteStaticMethodCall directive, a RewriteStaticFieldAccess directive, and a RewriteSuperClass directive.

The processing engine is programmed to know what to do in response to each type of directive. For example, upon encountering a PostConstructorObjectCheck directive, the processing engine knows that it is supposed to insert a call to a helper method of a helper class at a point immediately after the constructor is invoked. However, the processing engine does not know which constructor to do this for, or which helper method of which helper class to call. Thus, some additional information is provided with each directive.

Basically, a directive represents an instruction from the user to the processing engine. It tells the processing engine what to look for, what to do, and which functionality (if any) to invoke. In effect, the directives embody the knowledge that the user has with regard to the different platforms and the differences in behavior between the platforms. For example, the user knows that a certain constructor needs to have a certain argument checked before that argument is submitted to the constructor. In addition, the user knows what processing needs to be performed on that argument. The user provides this knowledge to the processing engine in the form of a directive. The directive tells the processing engine which constructor to look for. The directive tells the processing engine what to do (e.g. to perform a PreConstructorArgumentCheck), and the directive tells the processing engine which helper method to invoke to process the argument. Thus, through the directives, a user imparts his/her knowledge of the differences in behavior between the platforms to the processing engine. Because this knowledge is provided to the processing engine via the directives, this knowledge does not have to be hardcoded into logic of the processing engine. Thus, the processing engine can stay generic, which makes this approach quite extensible. To perform more operations, or to perform different operations, all that needs to be done is to provide a different set of directives to the processing engine. The code of the processing engine does not need to be changed (the only time the code of the processing engine has to change is if logic needs to be added to enable the processing engine to process more types of directives). Thus, the same processing engine can be used to perform code alteration to enable any set of code intended to execute on any platform to be executed on any other platform.

An embodiment of the rewriting module 120 is described in greater detail below. The following discussion sets forth the different types of directives, the additional information provided with each type of directive, and the actions taken by the rewriting module 120 in response to each type of directive. It should be noted that the following directives are shown for illustrative purposes only. More, fewer, or different types of directives may be implemented if so desired. These and other modifications/enhancements are within the scope of the present invention.

PreConstructorArgumentCheck

The PreConstructorArgumentCheck directive allows a user to insert a check into the bytecodes of a loading class to check an argument before that argument is passed to a constructor. As part of this directive, the user specifies: (1) the name of the class with which the constructor is associated; (2) the signature of the constructor (a class may have multiple constructors); (3) the number of the argument to be checked (a constructor may take in multiple arguments); (4) the name of a helper class; (5) the name of a helper method in the helper class; and (6) the signature of the helper method in the helper class. In response to this directive, the rewriting module 120 checks the bytecodes of the loading class for invocations of the constructor of the named class. If such an invocation is found, the rewriting module 120 inserts into the bytecodes of the loading class a call to the helper method of the helper class. This call is inserted at a point after the value of the specified argument is established but before the constructor is called. The specified argument is passed to the helper method as an argument. Once that is done, processing of the directive is complete.

PostConstructorObjectCheck

The PostConstructorObjectCheck directive allows a user to insert a check into the bytecodes of a loading class to check an object after a constructor has finished initializing the object. As part of this directive, the user specifies: (1) the name of the class with which the constructor is associated; (2) the signature of the constructor; (3) the name of a helper class; (4) the name of a helper method in the helper class; and (5) the signature of the helper method in the helper class. In response to this directive, the rewriting module 120 checks the bytecodes of the loading class for invocations of the constructor of the named class. If such an invocation is found, the rewriting module 120 inserts into the bytecodes of the loading class a call to the helper method of the helper class. This call is inserted at a point immediately after the invocation of the constructor. The object initialized by the constructor is passed to the helper method as an argument. Once that is done, processing of the directive is complete.

RewriteNonStaticMethodCall

The RewriteNonStaticMethodCall directive allows a user to replace a non static method call to a method of a class with a call to a substitute method of a substitute class. As part of this directive, the user specifies: (1) the name of the class; (2) the name of the method; (3) the signature of the method; (4) the name of a substitute class; (5) the name of a substitute method in the substitute class; and (6) the signature of the substitute method in the substitute class. In response to this directive, the rewriting module 120 checks the bytecodes of the loading class for calls to the named method of the named class. If such a call is found, the rewriting module 120 replaces the call with a static method call to the substitute method of the substitute class. The receiver object of the original call to the named method of the named class is passed to the substitute method of the substitute class as an argument. Once that is done, processing of the directive is complete.

RewriteStaticMethodCall

The RewriteStaticMethodCall directive allows a user to replace a static method call to a method of a class with a call to a substitute method of a substitute class. As part of this directive, the user specifies: (1) the name of the class; (2) the name of the method; (3) the signature of the method; (4) the name of a substitute class; (5) the name of a substitute method in the substitute class; and (6) the signature of the substitute method in the substitute class. In response to this directive, the rewriting module 120 checks the bytecodes of the loading class for calls to the named method of the named class. If such a call is found, the rewriting module 120 replaces the call with a static method call to the substitute method of the substitute class. Once that is done, processing of the directive is complete.

RewriteStaticFieldAccess

The RewriteStaticFieldAccess directive allows a user to replace a reference to a static field of a holder class with a reference to a static field of a helper class. As part of this directive, the user specifies: (1) the name of the holder class; (2) the name of the static field in the holder class; (3) the name of the helper class; and (4) the name of the static field in the helper class. In response to this directive, the rewriting module 120 checks the bytecodes of the loading class for references to the static field of the holder class. If such a reference is found, the rewriting module 120 replaces the reference to the static field of the holder class with a reference to the static field of the helper class. Once that is done, processing of the directive is complete.

Rewrite Superclass

The RewriteSuperclass directive allows a user to inject a substitute class into a class hierarchy to effectively "replace" another class. As part of this directive, the user specifies: (1) the name of the class that is to be "replaced"; and (2) the name of the substitute class. In response to this directive, the rewriting module 120 checks the bytecodes of the loading class for all bytecodes that create a new instance of the replaced class. In each of these bytecodes, the rewriting module 120 replaces the reference to the replaced class with a reference to the substitute class. The rewriting module 120 also searches for all bytecodes that invoke any constructor of or perform a superclass method call on the replaced class. In each of these bytecodes, the rewriting module 120 replaces the reference to the replaced class with a reference to the substitute class. Furthermore, the rewriting module 120 searches for all bytecodes in which a class tries to subclass the replaced class. For each class that tries to subclass the replaced class, the rewriting module 120 changes the declared superclass of that class to indicate the substitute class instead of the replaced class. Once that is done, processing of the directive is complete.

Hardware Overview

In one embodiment, the rewriting module 120 and the helper classes and substitute classes in section 122 may take the form of sets of instructions that are executed by one or more processors. If they take the form of sets of instructions, FIG. 3 shows a block diagram of a computer system 300 upon which these sets of instructions may be executed. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may further be a network connection that connects one or more of the components. Any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method performed by a processing engine to enable a set of code intended to be executed on a first platform to be executed on a second platform, the second platform being different from the first platform, the method comprising:
   receiving the set of code, wherein the set of code is loaded for execution during runtime by a class loader, and wherein the processing engine is invoked when the class loader for loading the set of code is invoked;
   identifying a class in the set of code, the class comprising a non-static method call to a reflective method targeting a receiver object, wherein the non-static method call produces a different result when executed on the first platform as compared to being executed on the second platform;
   accessing a set of data that includes a first directive, the first directive specifying to replace the non-static method call with a method call to a substitute method configured to produce identical results to the reflective method; and
   rewriting, in accordance with the first directive, the set of code to replace the non-static method call with the method call to the substitute method, wherein the non-static method call is replaced by passing the receiver object to the substitute method in the method call, wherein the substitute method is configured to:
      identify, from a database, a set of methods comprising only methods that are exposed to the set of code when the set of code is executed in both the first platform and the second platform; and
      return the set of methods.

2. The method of claim 1, wherein the set of data does not contain executable code.

3. The method of claim 1, further comprising:
   identifying, in the set of data, a second directive to insert a helper method for performing a pre constructor argument check;
   identifying, in the set of code, a location after a value of an argument is established and prior to a constructor being called with the argument; and
   inserting, at the location, an invocation of the helper method based on the second directive, wherein the helper method causes an exception when the value of the argument is not valid on both the first platform and the second platform.

4. The method of claim 1, further comprising:
   identifying, in the set of data, a second directive to insert a helper method for performing a post constructor object check;
   identifying, in the set of code and based on the second directive, a location immediately after an invocation of a constructor producing an object; and
   inserting, at the location, an invocation of the helper method based on the second directive, wherein the helper method causes the object to be the same on the first platform as on the second platform.

5. The method of claim 1, further comprising:
   identifying, in the set of data, a second directive to replace a reference to an inaccessible class that is inaccessible on one selected from a group consisting of the first platform and the second platform;
   identifying, in the set of code, the reference to the inaccessible class; and
   replacing the reference to the inaccessible class with a reference to a second class, wherein the second class produces an error when executed on both the first platform and the second platform.

6. A non-transitory machine readable medium comprising instructions which, when executed by one or more processors, cause the one or more processors to implement a method for enabling a set of code intended to be executed on a first platform to be executed on a second platform, the second platform being different from the first platform, the method comprising:
   receiving the set of code, wherein the set of code is loaded for execution during runtime by a class loader, and wherein the processing engine is invoked when the class loader for loading the set of code is invoked;
   identifying a class in the set of code, the class comprising a non-static method call to a reflective method targeting a receiver object, wherein the non-static method call produces a different result when executed on the first platform as compared to being executed on the second platform;
   accessing a set of data that includes a first directive, the first directive specifying to replace the non-static method call with a method call to a substitute method configured to produce identical results to the reflective method; and
   rewriting, in accordance with the first directive, the set of code to replace the non-static method call with the method call to the substitute method, wherein the non-static method call is replaced by passing the receiver object to the substitute method in the method call, wherein the substitute method is configured to:
      identify, from a database, a set of methods comprising only methods that are exposed to the set of code when the set of code is executed in both the first platform and the second platform; and
      return the set of methods.

7. The non-transitory machine readable medium of claim 6, wherein the set of data does not contain executable code.

8. The non-transitory machine readable medium of claim 6, wherein the method further comprises:
   identifying, in the set of data, a second directive to insert a helper method for performing a pre constructor argument check;
   identifying, in the set of code, a location after a value of an argument is established and prior to a constructor being called with the argument; and
   inserting, at the location, an invocation of the helper method based on the second directive, wherein the helper method causes an exception when the value of the argument is not valid on both the first platform and the second platform.

9. The non-transitory machine readable medium of claim 6, wherein the method further comprises:
   identifying, in the set of data, a second directive to insert a helper method for performing a post constructor object check;
   identifying, in the set of code and based on the second directive, a location immediately after an invocation of a constructor producing an object; and inserting, at the location, an invocation of the helper method based on the second directive, wherein the helper method causes the object to be the same on the first platform as on the second platform.

10. The non-transitory machine readable medium of claim 6, wherein the method further comprises:
identifying, in the set of data, a second directive to replace a reference to an inaccessible class that is inaccessible on one selected from a group consisting of the first platform and the second platform;
identifying, in the set of code, the reference to the inaccessible class; and
replacing the reference to the inaccessible class with a reference to a second class, wherein the second class produces an error when executed on both the first platform and the second platform.

* * * * *